United States Patent
Winterstein et al.

(10) Patent No.: US 9,951,891 B2
(45) Date of Patent: Apr. 24, 2018

(54) MAKING PIPE FOR LIQUID CONVEYANCE

(75) Inventors: Ralf Winterstein, Meiningen (DE); Stephan Muller, Hofheim i. Ufr (DE)

(73) Assignee: Uponor Innovation AB, Virsbo (SE)

( * ) Notice: Subject to any disclaimer, the term of this patent is extended or adjusted under 35 U.S.C. 154(b) by 244 days.

(21) Appl. No.: 13/985,918

(22) PCT Filed: Feb. 23, 2012

(86) PCT No.: PCT/EP2012/053064
§ 371 (c)(1),
(2), (4) Date: Aug. 16, 2013

(87) PCT Pub. No.: WO2012/113862
PCT Pub. Date: Aug. 30, 2012

(65) Prior Publication Data
US 2013/0319570 A1 Dec. 5, 2013

(30) Foreign Application Priority Data
Feb. 24, 2011 (FI) ...................... 20115183

(51) Int. Cl.
*F16L 9/147* (2006.01)
*B29C 47/00* (2006.01)

(52) U.S. Cl.
CPC .......... *F16L 9/147* (2013.01); *B29C 47/0023* (2013.01)

(58) Field of Classification Search
CPC ............. B29C 47/0023; B29C 47/023; B29C 47/021; B29C 47/065; B29C 47/0004; B21C 23/30
USPC ....... 138/137, 140, 141, 143, 146, 119, 127, 138/138, 158
See application file for complete search history.

(56) References Cited

U.S. PATENT DOCUMENTS

| | | | |
|---|---|---|---|
| 3,600,918 A | 8/1971 | Lemelson | |
| 4,509,559 A * | 4/1985 | Cheetham | E04B 1/94 138/121 |
| 4,979,679 A * | 12/1990 | Downs | C23C 4/08 138/103 |
| 6,354,331 B1 * | 3/2002 | Fisher | B29C 47/0023 138/104 |
| 7,416,763 B2 * | 8/2008 | Kanda | H05K 3/388 427/252 |

(Continued)

FOREIGN PATENT DOCUMENTS

| | | |
|---|---|---|
| CN | 2407210 Y | 11/2000 |
| CN | 1537209 | 10/2004 |

(Continued)

OTHER PUBLICATIONS

Office Action for Chinese Application No. 201280010314.9, dated Sep. 23, 2014, (English translation 13 pages).

*Primary Examiner* — Charles P Cheyney
(74) *Attorney, Agent, or Firm* — Occhiuti & Rohlicek LLP

(57) ABSTRACT

The invention relates to an apparatus for making a multi-layer composite pipe. The multilayer composite pipe comprises an innermost layer (2) made of plastic. The pipe has a seamless metal layer (4) or a metal layer (4) having an axial, non-overlapping seam. The outer surface of the metal layer is treated for changing its outer appearance. Thereafter a transparent outermost layer (8) is provided on the outer surface of the metal layer. The structure of the pipe is such that the pipe can be permanently bent to certain angles without significant spring back.

19 Claims, 1 Drawing Sheet

(56) References Cited

U.S. PATENT DOCUMENTS

| | | | |
|---|---|---|---|
| 2002/0007861 A1* | 1/2002 | Hansen | F16L 9/147 138/143 |
| 2002/0189697 A1* | 12/2002 | Jarvenkyla | B29C 44/022 138/127 |
| 2003/0102302 A1 | 6/2003 | Rahn | |
| 2004/0151858 A1 | 8/2004 | Bruenjes | |
| 2006/0070870 A1 | 4/2006 | Schettler et al. | |
| 2009/0026282 A1* | 1/2009 | Bonnet | B32B 1/08 237/69 |
| 2009/0139661 A1 | 6/2009 | Frimel et al. | |
| 2009/0304967 A1* | 12/2009 | Jarvenkyla | B21C 23/24 428/36.9 |
| 2010/0084037 A1* | 4/2010 | Ericsson | B32B 1/08 138/137 |
| 2010/0101292 A1* | 4/2010 | Biris | B21C 23/005 72/46 |

FOREIGN PATENT DOCUMENTS

| | | |
|---|---|---|
| CN | 101378858 | 3/2009 |
| CN | 101916627 | 12/2010 |
| EA | 200801616 | 2/2009 |
| EP | 0691193 | 1/1996 |
| EP | 0886741 | 2/2001 |
| EP | 1815919 | 8/2007 |
| WO | WO2007/088252 | 8/2007 |
| WO | WO 2007/088252 | 8/2007 |
| WO | WO 2010/040079 | 4/2010 |

* cited by examiner

MAKING PIPE FOR LIQUID CONVEYANCE

CROSS REFERENCE TO RELATED APPLICATION

This application is the national phase under 35 USC 371 of international application no. PCT/EP2012/053064, filed Feb. 23, 2012, which claims the benefit of the priority date of Finland application no. 20115183, filed Feb. 24, 2011. The contents of the aforementioned applications are incorporated herein in their entirety.

FIELD OF THE INVENTION

The invention relates to a multilayer composite pipe.

The invention further relates to a method of manufacturing a multi-layer composite pipe.

Further still, the invention relates to an apparatus for making a multi-layer composite pipe.

BACKGROUND OF THE INVENTION

Traditionally metal pipes, such as copper pipes, are used for potable water systems. However, metal pipes may be expensive, in part due to volatile metal prices, and their assembly may be cumbersome. Moreover, minerals in the water inside the pipe together with variation in the pH value may cause rapid corrosion in copper, for example. The corrosion in the copper causes an unsightly green layer on the outer surface of the pipe. Further, harmful substances may dissolve from the copper into the water inside the copper pipe.

Plastic pipes, such as pipes made of cross-linked polyethylene, are becoming extensively used for potable water systems. The possibilities to use them in surface mounting are, however, limited.

Document EP 0691193 discloses a multilayer composite pipe. The multilayer composite pipe is formed such that an inner layer is first extruded and coated with tie material. Thereafter an aluminium band is wrapped around the inner layer and welded such that a longitudinal welding seam is formed. The aluminium layer is coated with an outer plastic layer.

DE 2939388 discloses making of a pipe that has an inner layer made of plastic. Seamless metal layer, for example of aluminium, is pressed on the outside of the plastic layer.

WO 2007/088252 discloses a multilayer composite pipe. The multi-layer composite pipe comprises an inner layer of plastic and a seamless tubular metal layer over the inner layer. The metal layer may be covered with an outer plastic layer.

Flexible hoses are also known. EP 2154403 discloses a flexible hose having a metallized look. DE 19511216 discloses a double-walled flexible hose having an inner layer and an outer layer. Between the inner layer and the outer layer there is a colour layer. WO 02/101276 discloses a flexible plastic tube having a metallic appearance. The tube has an inner layer of plastic and a film outside the inner layer, which film has a metallic appearance. On the top of the layer having the metallic appearance there is an outer at least partially transparent protective layer. EP 0685675 discloses a flexible hose for sanitary applications, especially for the shower. The coloration and/or metallisation is achieved by a film which is hot pressed onto the pipe. EP 1197700 discloses a flexible hose having an inner layer of rubber or silicone and a decorative film of metallized plastic outside the inner layer. DE 7714185 discloses a flexible tube made of plastic, such as polyvinyl chloride, and having a spiral formed metal film wrapped around it. The metal film is covered with an outer plastic layer. DE 19737676 discloses a flexible hose having two metal coloured straps wound around a plastic hose. An outer hose is provided outside of the metal coloured straps. EP 0886741 discloses a flexible protective sleeve comprising a wall made of heat resistant plastics. The sleeve also comprises a layer of infra-red radiation-reflecting metal vacuum deposited on the outer surface of the wall. U.S. Pat. No. 5,555,913 discloses a plastic hose with a colouring and/or metallisation on its surface. The colouring and/or metallisation is produced by stamping on a hot stamping film. Flexible hoses may be used in shower or gardening hoses, for example. Their use in potable water systems and especially in surface mounting is, however, very limited.

WO 00/61977 discloses a stainless-plastic composite pipe.

CN 2492730 discloses a pipe having an inner pipe layer of plastic, an outer pipe layer of aluminium alloy and a protective layer of corrosion resistant metal material. The corrosion resistant metal material is coated with a coating layer of polishing electrophoresis.

DE 29807448 discloses a structure having an inner layer of polyvinyl chloride and an outer layer of chromed brass.

GB 2111164 discloses a composite pipe having a plastic inner layer which is surrounded by a longitudinally-fed metal foil coated on both sides with an adhesive. An outer layer of plastic is extruded onto the metal foil. The pipe is used in floor heating systems.

WO 01/85430 discloses a multilayer metal composite tube. A plastic lining is applied by extrusion to the interior of the metal tube and a plastic coating is applied to the exterior of the metal tube.

CA 1292154 discloses a metal pipe coated with a zinc film. A chromate film covers the zinc film. An intermediate layer consisting substantially of an epoxy resin covers the chromate film. A polyvinyl fluoride film covers the intermediate layer.

WO 2005/014279 discloses a pipe that has an inner metal body. The inner metal body has a coating comprising a zinc layer, a silicate layer and a synthetic resin layer.

EP 1316751 discloses a multilayer pipe. The multilayer pipe includes two tubular layers of plastic material, an inner layer and an outer layer and two intermediate metal layers.

Despite the numerous prior art there is clearly a need for a new pipe that is well suited for use in surface mounted installations.

BRIEF DESCRIPTION OF THE INVENTION

An object of the invention is to provide a new type of method and apparatus for making a multilayer composite pipe and a multilayer composite pipe.

The invention is characterized by the features of the independent claims.

A multilayer composite pipe is formed such that the multilayer composite pipe comprises an innermost layer made of a plastic. The pipe has a seamless metal layer or a metal layer having an axial, non-overlapping seam. The outer surface of the metal layer is treated for changing its outer appearance. Thereafter a transparent outermost layer is provided on the outer surface of the metal layer. The structure of the pipe is such that the pipe can be permanently bent to certain angles without significant spring back. The visual appearance of the pipe is aesthetically pleasing. The pipe may have a smooth shiny surface or other type of surface finish. The transparent outermost layer protects the metal layer surface against scratches, fingerprints and corrosion, for example. Because of its outer appearance and because the pipe can be bent permanently to certain angles without significant spring back, the pipe can be used in surface mounting or on-wall installations. The properties of the pipe can also be optimized for potable water systems. Moreover, the manufacture of the pipe is rather simple and therefore the cost of the pipe is reasonable.

BRIEF DESCRIPTION OF THE DRAWINGS

In the following, the invention will be described in greater detail by means of preferred embodiments with reference to the attached drawings, in which.

In the figures, the invention is presented in a simplified manner for the sake of clarity. In the figures like parts are designated by like reference numerals.

DETAILED DESCRIPTION OF THE INVENTION

Figure 1:
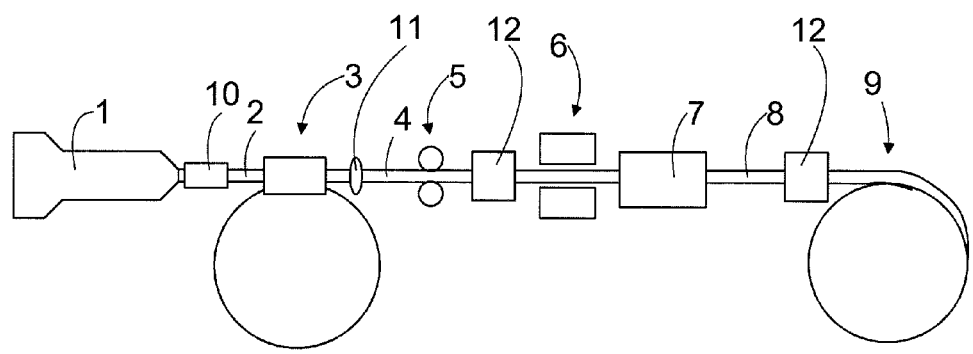
FIG. 1 is a schematic side view of a pipe manufacturing apparatus.
Figure 2:
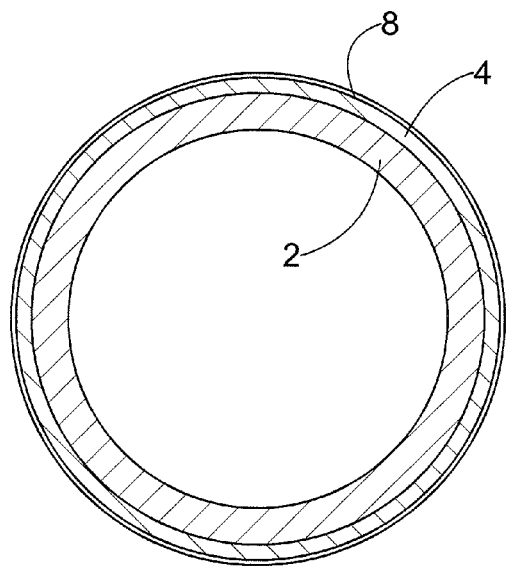
FIG. 2 is an end view in cross section of a multilayer composite pipe and FIG. 3 is a schematic side view of another pipe manufacturing apparatus.

FIG. 1 discloses one example of how a multilayer composite pipe is formed. FIG. 2 shows an example of such a pipe.

First an inner layer 2 of the pipe is extruded with a plastic extruder 1. The inner layer 2 constitutes the innermost layer of the pipe. There is a calibration/cooling basin 10 after the plastic extruder 1. The inner layer 2 may be coated with a tie layer. Thus, in the formed pipe there may be a tie layer between the inner layer 2 and the metal layer 4. The tie layer and the inner layer 2 can also be co-extruded. A tie layer is not needed if the inner layer 2 is made of high molecular weight plastic that itself has good adhesive properties due to grafted functional end groups, for example.

The inner layer 2 may be extruded, for example, of polyethylene PE, cross-linked polyethylene PEX, polypropylene PP or polybutylene-1PB, etc. One criteria for selecting the plastic material of the innermost layer may be that the plastic is approved for potable water conveyance. In that case the plastic must be inert in such a sense that no harmful substances migrate into water flowing inside the pipe. The tie layer may contain, for example, polyethylene PE with maleic anhydride.

A metal extrusion machine 3 may be in the same production line as the plastic extruder 1 and thus the plastic extruder 1 and the metal extrusion machine 3 may be in line as seen in FIG. 1. In that a case the extruded inner layer 2 is directly fed to the metal extrusion machine 3. If for example a cross linking process step is necessary, it is possible to first produce the inner layer 2 separately. Thus the inner layer 2 may be produced first and then coiled, for example. Next, the inner layer 2 is uncoiled and fed into the production line into the metal extrusion machine 3.

The inner layer 2 is thus fed into the metal extrusion machine 3. The metal extrusion machine 3 comprises a rotatably mounted wheel having one or more endless circumferential grooves. A shoe is adapted to close part of the grooves and mount tooling, which includes abutments arranged to at least partially block the grooves and a passage leading into a die structure. Metal feedstock is inserted into the rotating grooved extrusion wheel. The metal is heated and pressurised by friction and/or by additional heating means, such as electrical heaters. The material engages the abutment in a condition in which it flows through the passage and is extruded through the die structure. Thus, the material is softened but not melted. The die structure produces a tubular seamless layer of metal and the inner layer 2 is passed through a hollow mandrel in the die structure. A sufficient clearance is allowed between the metal layer and the inner layer to prevent heat damage to the inner layer. The extruded metal may be aluminium and hence an aluminium layer is formed. The metal may also be copper or magnesium, for example, or some other metal having a rather low softening temperature. Suitable characteristics for the metal can be achieved, for example, by alloying aluminium with other metals. The metal layer 4 may form an oxygen barrier layer for the pipe.

The metal layer 4 can also be formed of an aluminium sheet that is wrapped around the inner layer 2 and the edges of the sheet are welded together such that an axial seam is formed. The sheet must be dimensioned such that a butt-welded seam is formed. Thus the welded seam must be non-overlapping. A seamless metal layer or a metal layer having non-overlapping seam is required because only a very thin layer is provided outside the metal layer 4. A seamless metal layer or a metal layer having only non-overlapping seam does not need any outer layer for improving the outer appearance of the metal layer.

After extrusion, the metal layer 4 cools down. At this point, external cooling means can also be used. The cooling means may be a ring shaped cooling nozzle 11, for example, that blows cooling air onto the metal layer 4. Instead of or in addition to cooling air also any other cooling medium, such as water, may be used. The temperature of an extruded aluminium is about 500° C., for example, which means that the surface of the inner layer would get damaged if the metal layer 4 did not cool down before it contacts the surface of the inner layer 2.

After cooling, the metal layer 4 is led through forming rolls 5. The number of the forming rolls may be 2, 3 or 4 or more, depending on their structure. The forming rolls 5 perform a draw down process, which means that the diameter of the metal layer 4 is reduced, the metal layer thus coming into contact with the plastic inner layer 2. Reducing the diameter of the metal layer can be performed also by using conical convergent dies, for example, or another suitable method.

The material of the tie layer or the material of the inner layer 2 itself, if a tie layer is not used, is activated such that the inner layer 2 and the metal layer 4 adhere together. The material may be activated by heat, for example. The material may be activated by the heat of the metal layer 4. Thus, even though the metal layer is cooled, it has a temperature high enough for activating the material. It is also possible to reheat the metal layer by additional heating means.

The production line may also be provided with one or more haul-offs 12 for hauling the pipe from the metal extrusion machine 3. In the embodiment shown in FIG. 1 two haul-offs 12 are used.

The outer surface of the metal layer 4 is treated with surface treating means 6 for changing the outer appearance of the outer surface of the metal layer 4. The surface treating means 6 may comprise rotating brushes, for example. Instead of or in addition to the rotating brushes the surface treating means 6 may also comprise rotating rollers, band polishing means and/or blasting means, for example. The outer surface of the metal layer 4 is treated completely.

The outer appearance of the outer surface of the metal layer 4 can be changed by treating the surface mechanically and/or physically and/or chemically. Treating of the surface of the metal layer may comprise texturing, for example. Texturing may comprise polishing and/or blasting and/or etching, for example. Polishing may be mechanical polishing or chemical polishing, for example. It may be necessary to grind the surface in advance to remove scratches or grooves that cannot be removed by polishing alone, for example. Other outer appearances are possible by blasting the surface with sand, aluminium oxide, glass beads etc.

The treated outer surface of the metal layer 4 is covered by covering means 7. The covering means 7 provide a transparent outermost layer 8 on the outer surface of the metal layer for protecting the outer surface of the metal layer 4. The covering means 7 may comprise sprays for spraying the protection layer material on the outer surface of the metal layer 4. Another example of the covering means 7 is a bath or basin comprising the protection layer material, through which bath or basin the pipe is pulled. Moreover, the protection layer material may be applied on the outer surface of the metal layer 4 by electrostatic covering means, for example.

Examples of the protection layer material are thermal cure lacquers, UV cure lacquers, water-based baking varnish and varnish combined of hydroxyl acrylate and organic solvent, for example. The treated outer surface of the metal layer is adjacent to the outermost transparent layer 8. The transparent layer 8 may be totally transparent or partly transparent or translucent. Thus, in this description the term transparent layer 8 means that in the finished pipe the outer surface of the metal layer 4 is at least partly visible to the outside.

The outer diameter of the pipe may vary between 8 and 120 mm, for example. The thickness of the innermost layer 2 may vary between 1.0 and 10 mm, for example. The thickness of the metal layer 4 may vary between 0.1 and 2.0 mm, for example. The thickness of the transparent outermost layer 8 may vary between 10 nm and 50 μm, for example.

The pipe is used for conveying liquids. In one embodiment the pipe is used for conveying potable water.

Because of the structure of the pipe and especially because of the metal layer 4 the pipe can be permanently bent to certain angles without significant spring back. The bending resistance of the pipe is rather high, which means that the pipe remains straight extremely well. Correspondingly, when the pipe is bent, the cross section does not flatten very much. After bending, the pipe remains bent, so it does not straighten easily. Thus, the pipe is well suited for use in surface mounted installations. The definition that the pipe can be permanently bent to certain angles without significant spring back means that after bending there is no or only a small spring back. Thus, in one embodiment the spring back after bending is less than 10 degrees. In another embodiment the spring back after bending is less than 5 degrees. In a third embodiment the spring back after bending is less than 3 degrees.

Thus, because the pipe is used in surface mounting, it is typically bent during the mounting or installing of the pipe. Therefore the material of the outermost layer must not be so brittle that it would crack during bending.

At the end of the manufacturing process the multilayer composite pipe may be wound on a drum 9. If the pipe is used for an on-wall installation it has to be straightened before installation by means of a straightening unit.

It is also possible to omit the coiling or winding on the drum 9. Then the pipe is produced in sticks whereby the pipe remains very straight. In this case a cutter is used which cuts the pipe into sticks having an appropriate length. The length of the pipe sticks may vary as per need. The length of a stick may be between 2 m and 10 m, for example.

The treating of the surface and providing the outermost layer on the treated surface can also be performed off-line. Thus the surface treating and the coating may be performed after the pipe has been cut into sticks, for example.

Figure 3:
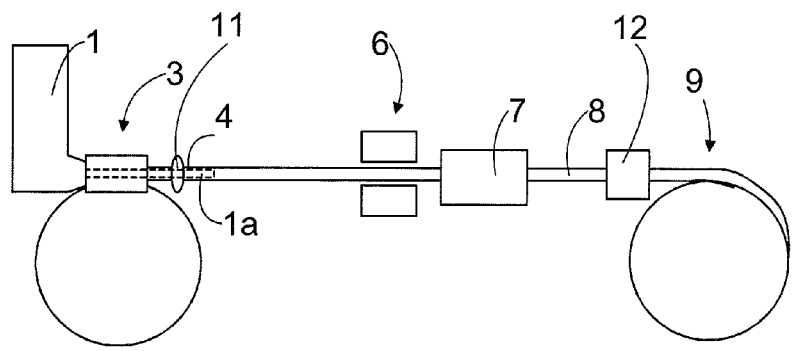

In the embodiment shown in FIG. 3 first the metal layer 4 is formed and the innermost layer of plastic is extruded inside the formed metal layer 4. The metal extrusion machine 3 forms the seamless metal layer 4. The plastic extruder 1 has a tool 1*a* that extends inside the formed metal layer such that plastic is extruded inside the metal layer. In this embodiment forming rolls 5 or any other means for performing a draw down process are not needed.

It is also possible to form the metal layer by wrapping and butt-welding and thereafter to extrude the innermost layer of plastic inside the formed metal layer.

It will be obvious to a person skilled in the art that, as the technology advances, the inventive concept can be implemented in various ways. The invention and its embodiments are not limited to the examples described above but may vary within the scope of the claims.

The invention claimed is:

1. A manufactured article comprising a multilayer composite pipe having an outer diameter that is between eight millimeters and one-hundred twenty millimeters, wherein said multilayer composite pipe has the property that, upon being bent by a first angle, said multilayer composite pipe will spring back by a second angle, wherein there exists a set of first angles such that, after having been bent to an angle that belongs to said set of first angles, said second angle will be an angle that is no greater than ten degrees, wherein said multilayer composite pipe comprises a plastic innermost layer having a thickness that is between one millimeter and ten millimeters, a seamless metal layer having a thickness that is between one-tenth of a millimeter and two millimeters, and an outermost layer having a thickness that is between ten nanometers and fifty-thousand nanometers, wherein the thickness of the plastic innermost layer, the thickness of the seamless metal layer, and the thickness of the outermost layer are dimensioned to promote resistance to bending of the multilayer composite pipe, wherein, after having been formed, said seamless metal layer has an outer surface that has a first outer appearance, wherein, as a result of having been treated after having been formed, said outer surface of said seamless metal layer has a second outer appearance that differs from said first outer appearance, wherein said outer surface is at least partially visible through said outermost layer, which permits light to pass therethrough, and wherein said outermost layer is disposed to protect said outer surface of said seamless metal layer.

2. The manufactured article of claim 1, wherein said outer surface is a textured surface.

3. The manufactured article of claim 1, wherein said outermost layer is transparent.

4. The manufactured article of claim 1, wherein said metal layer comprises aluminum.

5. The manufactured article of claim 1, wherein said seamless metal layer comprises an oxygen-barrier layer.

6. The manufactured article of claim 1, wherein said outer surface is a blasted surface.

7. The manufactured article of claim 1, wherein said outermost layer comprises cured lacquer.

8. The manufactured article of claim 1, wherein said outermost layer is translucent.

9. The manufactured article of claim 1, wherein said second angle is less than three degrees.

10. The manufactured article of claim 1, further comprising a tie layer between said inner layer and said seamless metal layer.

11. The manufacture of claim 1, wherein said outer surface is a polished surface.

12. A method comprising manufacturing an eight-millimeter to one hundred-and-twenty millimeter diameter multilayer composite pipe that responds to being bent by a first angle by springing back by a second angle, wherein there exists a set of first angles such that, after having been bent to an angle that is a member of said set of first angles, said pipe responds by springing back by a second angle that is no greater than ten degrees, wherein manufacturing said multilayer composite pipe comprises extruding an innermost layer of plastic, forming a metal layer, changing an appearance of an outer surface of said metal layer, and protecting said outer surface after having changed said appearance thereof, wherein changing said appearance of said outer surface comprises treating said outer surface, wherein protecting said outer surface after having changed said appearance thereof comprises, after having treated said outer surface, forming an outermost layer on said treated outer surface for protecting said outer surface, wherein forming said transparent outermost layer comprises forming a transparent outermost layer that has a thickness that is less than the lesser of a thickness of said innermost layer of plastic and a thickness of said metal layer and through which said outer surface is at least partially visible, wherein extruding said innermost layer comprises extruding a plastic layer that has a thickness that is between one millimeter and ten millimeters, wherein a ratio of said thickness of said innermost layer to said diameter is between 5/4 and 1/120, and wherein forming said metal layer comprises forming a metal layer that has a thickness that is between one-tenth of a millimeter and two millimeters, wherein the thickness of the plastic innermost layer, the thickness of the metal layer, and the thickness of the outermost layer are dimensioned to promote resistance to bending of the multilayer composite pipe, and wherein forming said metal layer comprises causing said metal layer to be formed seamlessly, wherein forming said outermost layer comprises forming an outermost layer that has a thickness that is between ten nanometers and fifty-thousand nanometers, and wherein causing said metal layer to be formed seamlessly comprises extruding said metal layer.

13. The method of claim 12, wherein treating said outer surface comprises texturing said outer surface.

14. The method of claim 12, wherein extruding said innermost layer of plastic comprises extruding said plastic layer inside said metal layer after said metal layer has already been formed.

15. The method of claim 12, wherein extruding said innermost layer of plastic comprises extruding said plastic layer before said metal layer has been formed, and wherein forming said metal layer comprises, after having extruded said plastic layer, forming said metal layer around said extruded plastic layer.

16. An apparatus for making a multilayer composite pipe that has an outer diameter that is between eight millimeters and one-hundred twenty millimeters and that has the property that, upon being bent by a first angle, said multilayer composite pipe will spring back by a second angle that is less than said first angle, wherein there exists a set of first angles such that, after having been bent to an angle within said set of first angles, said second angle will be less than ten degrees, wherein said apparatus comprises a first extruder configured for extruding an innermost layer of plastic that is thicker than one millimeter but that is no thicker than ten millimeters, a second extruder configured for forming a metal layer that has a thickness of no less than a tenth of a millimeter and no more than two millimeters, a surface-treating machine for treating said outer surface of said metal layer for changing its outer appearance and a covering machine for covering said treated outer surface of said metal layer with a protective layer that protects said outer surface while permitting said outer surface to be at least partially visible, said protective layer having a thickness that is no less than ten nanometers and that is no greater than fifty-thousand nanometers, wherein the thickness of the plastic innermost layer, the thickness of the metal layer, and the thickness of the outermost layer are dimensioned to promote resistance to bending of the multilayer composite pipe, wherein said second extruder comprises a metal-extrusion machine that is configured to form a seamless metal layer.

17. The apparatus of claim 16, wherein said first extruder is arranged to extrude said innermost layer of plastic inside said formed metal layer.

18. The apparatus of claim 16, wherein said second extruder is arranged to form said metal layer on said formed innermost layer.

19. The manufactured article of claim 1, wherein said second angle is less than five degrees.

* * * * *